United States Patent
Tanaka et al.

(10) Patent No.: US 8,093,169 B2
(45) Date of Patent: Jan. 10, 2012

(54) HIGH-DURABILITY SLEEVE BRICKS

(75) Inventors: Masato Tanaka, Fukuoka (JP); Eiichiro Hatae, Fukuoka (JP); Toshiyuki Hokii, Fukuoka (JP); Joki Yoshitomi, Fukuoka (JP)

(73) Assignee: Krosakiharima Corporation, Fukuoka (JP)

( * ) Notice: Subject to any disclaimer, the term of this patent is extended or adjusted under 35 U.S.C. 154(b) by 124 days.

(21) Appl. No.: 12/513,729

(22) PCT Filed: Nov. 6, 2007

(86) PCT No.: PCT/JP2007/071534
§ 371 (c)(1),
(2), (4) Date: Dec. 18, 2009

(87) PCT Pub. No.: WO2008/056655
PCT Pub. Date: May 15, 2008

(65) Prior Publication Data
US 2010/0092750 A1   Apr. 15, 2010

(30) Foreign Application Priority Data
Nov. 6, 2006   (JP) ................. 2006-300073

(51) Int. Cl.
   *C04B 35/043*   (2006.01)
(52) U.S. Cl. ......... 501/108; 501/109; 266/283; 266/284
(58) Field of Classification Search .......... 501/108, 501/109; 266/283, 284
See application file for complete search history.

(56) References Cited

U.S. PATENT DOCUMENTS

| | | | | |
|---|---|---|---|---|
| 4,306,030 A | * | 12/1981 | Watanabe et al. | 501/99 |
| 4,431,745 A | * | 2/1984 | Watanabe et al. | 501/101 |
| 4,957,887 A | * | 9/1990 | Michael et al. | 501/101 |
| 5,250,479 A | * | 10/1993 | Rancoule et al. | 501/101 |
| 5,559,064 A | * | 9/1996 | Tsuchinari et al. | 501/120 |

FOREIGN PATENT DOCUMENTS

| | | | |
|---|---|---|---|
| EP | 116194 | * | 8/1984 |
| JP | 05-051942 A | | 7/1993 |
| JP | 6220517 A | | 8/1994 |
| JP | 08259312 | * | 10/1996 |
| JP | 8259312 A | | 10/1996 |
| JP | 6445770 | * | 2/1998 |
| JP | 2000309818 A | | 11/2000 |
| JP | 2002249371 A | | 9/2002 |
| JP | 2004123449 A | | 4/2004 |

OTHER PUBLICATIONS

International Search Report mailed Jan. 29, 2009 for PCT/JP2007/071534 filed Nov. 6, 2007.
English translation of the International Preliminary Report on Patentability published May 26, 2009 for PCT/JP2007/071534 filed Nov. 6, 2007.
English translation of the Written Opinion of the International Searching Authority published May 20, 2009 for PCT/JP2007/071534 filed Nov. 6, 2007.

* cited by examiner

*Primary Examiner* — Karl Group
(74) *Attorney, Agent, or Firm* — Martin Fleit; Paul D. Bianco; Fleit Gibbons Gutman Bongini & Bianco PL

(57) ABSTRACT

Disclosed is a magnesia-carbon based sleeve brick for steelmaking converters, which is obtained by adding, to a refractory raw material mix containing 60 to 95 mass % of a magnesia raw material and 5 to 20 mass % of graphite, a metal powder of one or more selected from the group consisting of Al, Si, Mg, Ca, Cr and an alloy thereof, in an amount of greater than 3 to 6 mass %, and an organic binder, in addition to 100 mass % of the refractory raw material mix, and subjecting the resulting mixture to kneading, forming and heat treatment, wherein the sleeve brick is used under a condition that a thickness thereof is set at 70 mm or less. This makes it possible to prevent cracking which would otherwise occur in the sleeve brick itself, to allow the sleeve brick to have enhanced durability. One or more selected from the group consisting of B, $B_4C$, $MgB_2$, $CaB_6$, and CrB may be further added in an amount of 0.1 to 3 mass %, in addition to 100 mass % of the refractory raw material mix, to enhance strength and oxidation resistance and further enhance the durability. The magnesia raw material may comprise a first particle fraction having a particle diameter of greater than 10 to 500 μm and occupying 20 to 50 mass % in the refractory raw material mix, and a second particle fraction having a particle diameter of 10 μm or less and occupying 5 mass % or less in the refractory raw material mix, to additionally enhance corrosion resistance and thermal shock resistance.

11 Claims, 1 Drawing Sheet

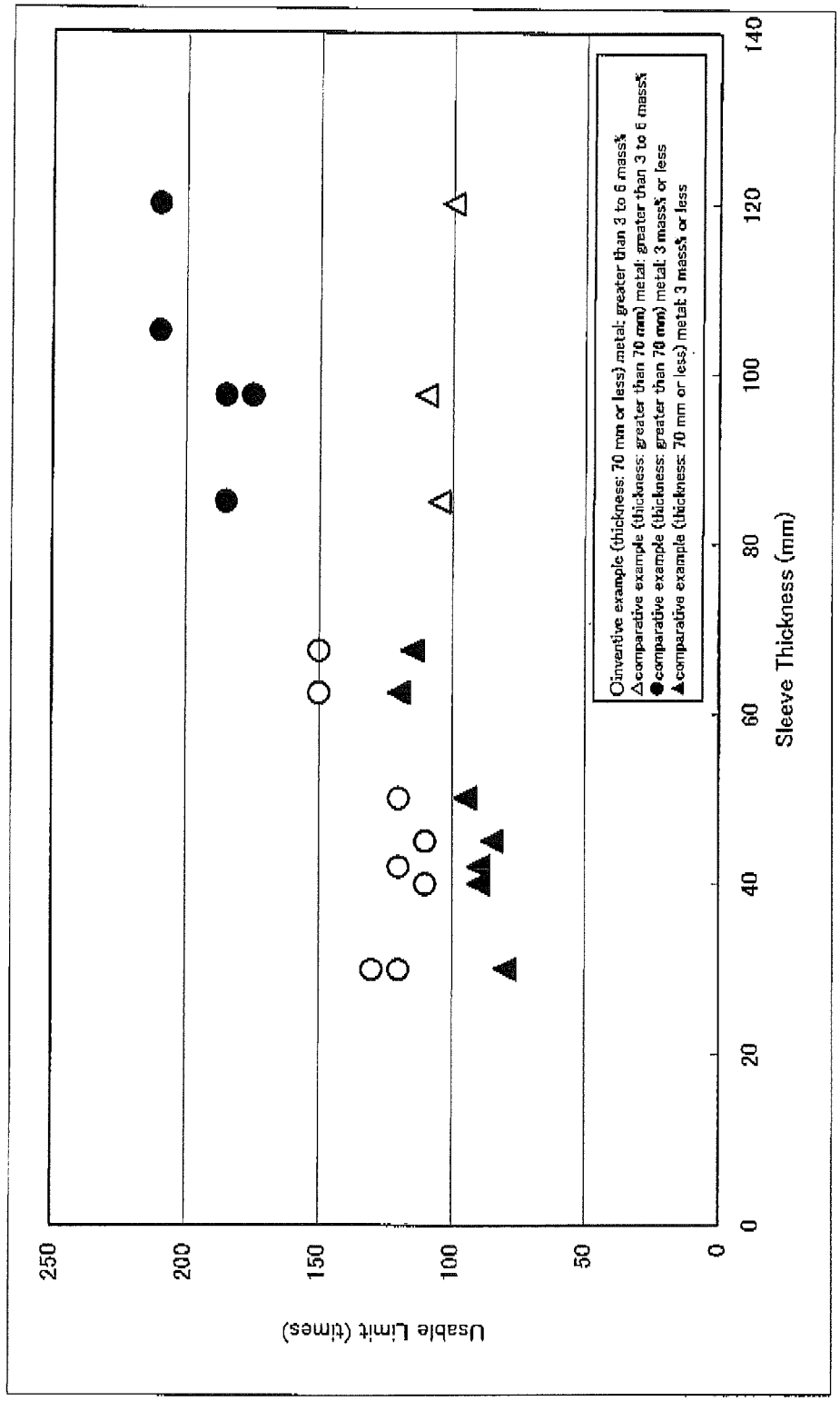
FIGURE

HIGH-DURABILITY SLEEVE BRICKS

TECHNICAL FIELD

The present invention relates to a sleeve brick for steelmaking converters.

BACKGROUND ART

A steelmaking converter is provided with a taphole for discharging molten steel to a ladle or the like therethrough, wherein the taphole is defined by a tubular-shaped refractory member. Generally, this refractory member is called, "taphole sleeve brick" or simply "sleeve brick".

The taphole sleeve brick is required to have thermal shock resistance and oxidation resistance, because it is exposed to rapid changes in temperature and atmosphere during a waiting or shutdown period after a tapping operation in a converter, and further required to have abrasion (erosion) resistance and high strength, because it is severely exposed to a high-temperature molten steel stream during the tapping operation.

An unburned magnesia-carbon based material is widely used as a refractory material for the taphole sleeve brick. Although the magnesia-carbon based material is excellent in thermal shock resistance and therefore suitable for the taphole sleeve brick to be used under severe thermal shock conditions, there remains a strong need for further extending a durable period of the taphole sleeve brick to improve a converter-operating rate.

Heretofore, in order to enhance oxidation resistance and strength so as to achieve longer durable period, a metal additive, such as aluminum or boride, has been used as effective means therefor. The addition of a metal powder, such as an aluminum powder, has a significant strength-enhancing effect which arises from creation of secondary bonds based on carbide and spinel formation and from matrix densification based on volume expansion, and simultaneously enhances abrasion resistance. On the other hand, it causes significant deterioration in thermal shock resistance. Thus, the metal powder is generally added in a small amount.

It has also been practiced to reduce a content of carbon, such as graphite, i.e., use a low-carbon material, to obtain a strong matrix based on matrix densification and formation of an MgO-rich layer on an operating surface, so as to suppress abrasion (erosion) due to a molten steel stream, and oxidation. Typically, a magnesia-carbon brick contains flake graphite in an amount of about 20 mass %. It is known that, if the flake graphite is drastically reduced to a level of 10 mass % or less, abrasion resistance and oxidation resistance will be enhanced, which leads to improvement in durability.

For example, the following Patent Document 1 discloses a low-carbon MgO—C refractory material for a converter taphole, which contains 1 to 8 weight % of a carbon raw material, 0.3 to 5 weight % of pitch, 0 to 1.5 weight % of a metal additive and 0 to 0.8 weight % of boride. It is described that this refractory material is characterized by containing a relatively small amount (1 to 8 mass %) of carbon, and a given amount of pitch powder, which makes it possible to obtain an advantage of being able to suppress oxidation damage without spoiling excellent thermal shock resistance of the MgO-based refractory material, and have high post-burning bending strength, and excellent slag-corrosion resistance.

The following Patent Document 2 discloses a converter sleeve brick produced by adding 3 to 5 mass % of organic binder, tar or pitch, to a refractory material which comprises 60 to 90 mass % of magnesia, 5 to 35 mass % of graphite, 1 to 10 mass % of aluminum powder, and 0.1 to 20 mass % of chromium-alloy fibers, and subjecting the resulting mixture to kneading and forming. It is also disclosed that oxidation resistance and thermal shock resistance in the obtained converter-taphole sleeve brick are enhanced by adding/mixing the chromium-alloy steel fibers thereto.

The following Patent Document 3 discloses a taphole sleeve for steelmaking converters, excellent in slag resistance, which is prepared by subjecting a mix containing resin-coated magnesia particles and carbon, to a forming process.

[Patent Document 1] JP 8-259312A
[Patent Document 2] JP 6-220517A
[Patent Document 3] JP 2000-309818A

DISCLOSURE OF THE INVENTION

Problem to be Solved by the Invention

However, each of the sleeve bricks disclosed in the above Patent Documents cannot obtain a satisfactory result in terms of desired durable period. Moreover, the sleeve brick shows large variations in durability depending on a converter using it, and thereby cannot obtain a stable result.

One factor dominating durability of a sleeve brick is splitting or cracking which occurs in the sleeve brick itself. The cracking inevitably leads to sudden sleeve brick replacement.

A cause for the cracking may include: thermal shock caused by a temperature rise during passing of molten steel; stress applied to an inner bore of the sleeve brick during passing of molten steel; and fracture caused by an external force arising from stirred molten steel during a tapping operation. An inner diameter, an outer shape, a length and other dimensions/configurations of the sleeve brick also have an impact on the cracking, and each of them varies depending on a converter using the sleeve brick. Thus, it is extremely difficult to identify the cause for the cracking.

As above, heretofore, a clear criterion for material selection has lacked in specifying and designing a magnesia-carbon based material to be used for a taphole sleeve brick, resulting in difficulty in improving quality of the material, and material selection based on repetition of trial and error.

In a magnesia-carbon based sleeve brick for steelmaking converters, it is an object of the present invention to prevent cracking which would otherwise occur in the sleeve brick itself, to allow the sleeve brick to have enhanced durability.

Means for Solving the Problem

The present invention is based on knowledge that it is critical as a factor determining durability to set respective addition rates of a metal powder and graphite depending on a thickness of a sleeve brick, which has been obtained as a result of various experimental tests carried out while positioning a thickness of a sleeve brick as a key parameter for material design.

More specifically, it has been found that, when an addition rate of each of a metal powder and graphite is set in an adequate range depending on a thickness of a sleeve brick, it becomes possible to prevent cracking which would otherwise occur in the sleeve brick itself, to obtain a taphole sleeve brick remarkably excellent in durability.

A dominant factor causing damage of a sleeve brick depends on a thickness of the sleeve brick, and it is necessary to give priority to strength if the sleeve brick has a relatively small thickness, and give priority to thermal shock resistance if the sleeve brick has a relatively large thickness.

In a sleeve brick having a relatively small thickness, it is assumed that, in a situation where an inner bore of the sleeve brick is gradually damaged and enlarged along with an increase in the use of the sleeve brick (the number of tapping cycles), and consequently the thickness is gradually reduced, the sleeve brick is fractured due to its strength insufficient to withstand a stress applied to the inner bore during passing of molten steel or an external force arising from stirred molten steel during a tapping operation. In a sleeve brick having a relatively large thickness, it is considered that cracking due to thermal shock becomes a key factor determining a durable period, because strength of the sleeve brick itself is ensured based on the thickness thereof.

As above, the key knowledge as the basis of the present invention is that a damage mode will differently appear depending on a sleeve thickness, and it is necessary to perform material design depending on the sleeve thickness. It is also assumed that a weighting of required properties in each sleeve is to be continuously changed in response to a thickness thereof. Further, the damage mode is relatively clearly changed at a threshold where the sleeve thickness is about 70 mm, and it is necessary to give priority to strength when the sleeve thickness is less than the threshold, and give priority to spalling resistance when the sleeve thickness is greater than the threshold.

Specifically, the present invention provides a high-durability sleeve brick obtained by adding, to a refractory raw material mix containing 60 to 95 mass % of a magnesia raw material and 5 to 20 mass % of graphite, a metal powder of one or more selected from the group consisting of Al, Si, Mg, Ca, Cr and an alloy thereof, in an amount of greater than 3 to 6 mass %, and an organic binder, in addition to 100 mass % of the refractory raw material mix, and subjecting the resulting mixture to kneading, forming and heat treatment, wherein the sleeve brick has a thickness of 70 mm or less.

Under a condition that the sleeve thickness is 70 mm or less, the metal powder is used in an amount of greater than 3 to 6 mass % in order to enhance strength. If the amount is 3 mass % or less, the strength of the sleeve brick becomes insufficient, and thereby cracking is likely to occur during use to cause deterioration in durability. If the amount is greater than 6 mass %, thermal shock resistance becomes insufficient due to an increased elastic modulus caused by densification in matrix, and thereby cracking is likely to occur to cause deterioration in durability.

Further, under the condition that the sleeve thickness is 70 mm or less, the metal powder is used in the relatively large amount, so that even if graphite is used in a relatively large amount, an effect of suppressing deterioration in ablation resistance and strength can be obtained, and thus the durability is enhanced as a whole. In order to ensure thermal shock resistance, graphite is used in an amount of 5 to 20 mass %. If the amount of graphite is less than 5 mass %, thermal shock resistance becomes insufficient, and thereby cracking is likely to occur during use to cause deterioration in durability. If the amount is greater than 20 mass %, ablation caused by molten steel and losses due to insufficient strength become larger during use to cause deterioration in durability.

In the sleeve brick of the present invention, in view of corrosion resistance, a magnesia raw material is contained in an amount of 60 to 95 mass %, preferably 80 to 95 mass %, with respect to the total amount of the refractory raw material mix. If the amount is less than 60 mass %, corrosion resistance becomes insufficient. If the amount is greater than 95 mass %, the addition rate of graphite relatively becomes insufficient, and thereby thermal shock resistance becomes insufficient.

Although the sleeve brick of the present invention can have excellent durability and high versatility even if the refractory raw material mix consists only of a magnesia raw material and graphite, other raw material may be used in the refractory raw material mix, according to use conditions, as with conventional magnesia-carbon bricks. For example, one or more selected from the group consisting of alumina-magnesia spinel, alumina, zirconia, silica, carbon black, coke, pitch powder, and silicon carbide, may be used in an amount of 1 to 20 mass %. However, if the amount becomes greater than 20 mass %, corrosion resistance of the sleeve brick will start deteriorating.

The magnesia raw material to be used in the present invention may be a type which is sold on the open market as a raw material for refractory products. The use of fused magnesia clinker containing 98% or more of MgO allows the sleeve brick to have more enhanced corrosion resistance.

The graphite to be used in the refractory raw material mix may be, for example, flake graphite or synthetic graphite which is commonly used as a raw material for refractory products. Further, the flake graphite may be expandable graphite. The expandable graphite is a kind of flake graphite, i.e., a raw material prepared by subjecting flake graphite to a chemical treatment to induce expansion and then pulverizing the expanded flake graphite. While expandable graphite includes several types, such as platy graphite, any of them may be used in the present invention.

The metal powder to be added to the refractory raw material mix may be made of one or more selected from the group consisting of Al, Si, Mg, Ca, Cr and an alloy thereof, from a viewpoint that they are capable of enhancing strength and oxidation resistance, and less likely to exert a negative effect on a refractory matrix. The metal powder traps oxygen in the refractory product to bring out a ceramic bond-creating function and a graphite oxidation-protecting function, and the resulting oxide has a high melting point, i.e., excellent corrosion resistance. Preferably, the metal powder is used under a condition that a particle size thereof is set to be 0.1 mm or less, in order to allow the metal powder to be uniformly dispersed over the matrix even if it is used in a small amount.

Further, one or more selected from the group consisting of B, $B_4C$, $MgB_2$, $CaB_6$ and CrB may be added to the refractory raw material mix in an amount of 0.1 to 3 mass %, in addition to 100 mass % of the refractory raw material mix. The addition of boron and/or the boride makes it possible to enhance strength and oxidation resistance and further enhance the durability. If the addition rate is less than 0.1 mass %, strength and oxidation resistance are not sufficiently enhanced. If the addition rate is greater than 3 mass %, the thermal shock resistance will deteriorate. Preferably, the boron or boride is used under a condition that a particle size thereof is set to be 0.1 mm or less, in order to allow the boron or boride to be uniformly dispersed over the matrix even if it is used in a small amount.

During use, the metal(s) in the refractory product is transformed into an oxide, and the metal oxide is expanded in volume through a reaction with magnesia, to densify a matrix of the brick, so that a strength-enhancing effect is sufficiently obtained, whereas thermal shock resistance is lowered and thereby durability of the sleeve brick is likely to become insufficient depending on use conditions. Therefore, in the magnesia raw material, a fine-particle fraction, particularly, a fraction having a particle diameter of 10 μm or less, may be not used or reduced, because it easily reacts with the metal oxide due to its high activity to cause excessive densification of the matrix. This makes it possible to further enhance the thermal shock resistance while suppressing excessive deterioration in strength. Further, if a raw material having a particle diameter of 10 μm or less becomes greater than 5 mass % in the refractory raw material mix, it becomes difficult to obtain a thermal shock resistance-enhancing effect.

In the sleeve brick of the present invention, an amount of magnesia in the magnesia raw material having a particle diameter of greater than 10 to 500 μm may be set in the range of 20 to 50 mass % in the refractory raw material mix, to allow the sleeve to have high strength and thermal shock resistance. If the amount of magnesia having a particle diameter of greater than 10 to 500 μm is less than 20 mass %, the matrix has a porous structure, and thereby a corrosion resistance-enhancing effect becomes insufficient. If the amount is greater than 50 mass %, magnesia reacts with the metal oxide, and an influence of the resulting densification of the matrix becomes unignorable to cause deterioration in thermal shock resistance.

The metal powder and an organic binder are added to the refractory raw material mix containing the above raw materials at the given mixing rates, and the resulting mixture is subjected to kneading, forming and heat treatment to obtain the sleeve brick. In this process, a particle size distribution, a forming pressure or the like may be controlled to change a hot strength and an elastic modulus.

The organic binder is used as a means to produce sufficient strength for handling, through pressure forming and heat treatment, and create carbon bonds through heating. As the organic binder, one or more selected from the group consisting of phenol resin, furan resin and pitch may be used.

The sleeve brick may be formed to have a tapered portion in an inner bore and/or an outer surface thereof, or may be formed in a throat shape. The inner bore may have a non-circular shape in section, such as an oval shape.

Fundamentally, the thickness of the sleeve brick means a thickness of a thinnest portion thereof. However, when the sleeve brick has a tapered portion, the thickness of the sleeve brick means a minimum thickness of the remaining portion other than the tapered portion. Further, when the inner bore is tapered over an overall length thereof, the thickness of the sleeve brick means a minimum thickness in a region where the inner bore is narrowed. When there is a step inside the inner bore, the thickness of the sleeve brick means a minimum thickness in a region of the inner bore having a smaller diameter.

In the sleeve brick of the present invention, cracking which would otherwise occur in the sleeve brick itself during use is significantly suppressed. This effect becomes prominent, particularly in a large-size sleeve brick having an overall length of 700 to 3000 mm.

Effect of the Invention

Each of graphite and the metal powder is mixed/added at an adequate rate depending on a thickness of a taphole sleeve brick, so that durability of the taphole sleeve brick is remarkably enhanced.

In addition, by use of the sleeve brick of the present invention, a periodical sleeve replacement span is extended, and the frequency of sudden sleeve-brick replacement operations coping with fracture or the like is drastically reduced, so that the frequency of converter shutdown associated with a sleeve-brick replacement operation is reduced, and thereby a production process becomes more stable.

BRIEF DESCRIPTION OF DRAWINGS

The FIGURE shows a relationship between a thickness and a usable limit of each sleeve brick in inventive examples and comparative examples.

BEST MODE FOR CARRYING OUT THE INVENTION

An embodiment of the present invention will now be described based on examples.

Examples

Inventive examples are shown in Table 1, and comparative examples are shown in Table 2. Dimensions of each of a plurality of cylindrical-shaped sleeve bricks produced according to Tables 1 and 2 are shown in Table 3. A plurality of sleeve bricks having different shapes were produced in respective compositions thereof. Tables 1 and 2 show a measurement result on physical properties of each of the sleeve bricks, and a test result on a usable limit of each of the sleeve bricks in a converter. Any sleeve bricks produced in each of the inventive and comparative examples which is assigned with a specific number, have the same shape. For example, in the inventive or comparative example 1, sleeve bricks having the same shape (sleeve code A) were used. Further, in the inventive or comparative example 2, sleeve bricks having the same shape (sleeve code B) were produced.

In the inventive and comparative examples listed in Tables 1 and 2, fused magnesia having a purity of 99 mass % and particle fractions combined in an appropriate particle size distribution was used as a magnesia raw material. Further, a fine powder of natural flake graphite having a purity of about 99 mass % and a particle size of 0.5 mm or less was used as flake graphite. Each of the metal powder and boride in Tables 1 and 2 was formed as a powder having a particle size of 0.05 mm or less. A combination of powdered pitch and phenol resin, or phenol resin, was used as an organic binder. The phenol resin was subjected to viscosity control using a solvent consisting primarily of ethylene glycol, and then added in an appropriate amount to obtain a kneaded mixture suitable for forming conditions. In Tables 1 and 2, an amount of each of the pitch, the metal powder and the boride to be added is indicated by a rate (mass %) with respect to and in addition to 100 mass % of a refractory raw material mix consisting of the magnesia raw material and the graphite.

The metal powder, the phenol resin as the organic binder, and, optionally, pitch (in powder form) and/or boride, were added to the refractory raw material mix, according to Tables 1 and 2, and the resulting mixture was kneaded and then formed into a taphole sleeve brick through a CIP process. The formed taphole sleeve brick was subjected to a heat treatment at 300° C.

A test piece was cut out from the prepared sleeve brick to measure an apparent porosity thereof according to JIS-R2205. Further, a hot bending strength was measured at 1400° C. according to the measuring procedure of JIS-2213. The taphole sleeve brick was experimentally used in a converter. The usable limit is indicated by an average value of respective usable limits of three sleeve bricks used in the test. In the test on the usable limit, the use of the sleeve brick was discontinued when an actual tapping time became less than a predetermined tapping time, and it was judged that the predetermined tapping time cannot be ensured by repair of an inner bore of the sleeve brick and thereby a problem will occur in a tapping operation. The use of the sleeve brick was also discontinued when it was judged that the use is hardly continued due to sudden cracking.

Each of a rate of a first particle fraction of the magnesia raw material having a particle diameter of greater than 10 to 500 μm, and a rate of a second particle fraction of the magnesia raw material having a particle diameter of 10 μm or less, is a measurement result on a rate of each of the particle fractions contained in 100 mass % of the refractory raw material mix. Specifically, a particle size distribution was determined by sampling the magnesia raw material just before being mixed, sieving the sampled magnesia raw material by a sieve having an opening of 1 mm, and subjecting the resulting undersize fraction to a measurement using a light scattering particle size distribution analyzer, and each of the rates of the first and second particle fractions of the magnesia raw material was calculated based on a corresponding mixing rate thereof.

The FIGURE shows a graph in which the results in Tables 1 and 2 are plotted in terms of a relationship between a thickness of a sleeve brick and a usable limit (durable period) thereof in a converter. The FIGURE shows two cases: one case where an addition amount of the metal powder is in the range of greater than 3 to 6 mass %; the other case where the addition amount of the metal powder is 3 mass % or less, for each of the inventive and comparative examples, in a distinguishable manner, in order to check an influence of the addition amount of the metal powder on the usable limit in a converter.

As seen in the FIGURE, a correlativity between the metal-powder addition amount and the usable limit is largely changed at a threshold where a thickness of a sleeve brick is about 70 mm. Specifically, as seen in the FIGURE, when the sleeve brick thickness is 70 mm or less, sleeve bricks of the inventive examples in a region in a region indicated by white circles (○), i.e., sleeve bricks where the metal-powder addition amount is in the range of greater than 3 to 6 mass %, are less subject to cracking and significantly superior in durability to sleeve bricks of the comparative examples in a region indicated by black triangles (▲), i.e., sleeve bricks where the metal-powder addition amount is 3 mass % or less.

However, when the sleeve-brick thickness is greater than 70 mm, sleeve bricks of the comparative examples in a region indicated by white triangles (Δ), i.e., sleeve bricks where the metal-powder addition amount is in the range of greater than 3 to 6 mass %, are inferior in durability to sleeve bricks of the inventive examples in a region indicated by black circles (●), i.e., sleeve bricks where the metal-powder addition amount is 3 mass % or less. Supposedly, the reason is that, when the sleeve thickness is greater than the threshold of about 70 mm, thermal shock becomes a primary factor causing damage, and cracking occurs due to cracks developed in an inner bore in consequence of the metal powder added in a relatively large amount, to cause deterioration in durability.

In Table 1, the composition in each of the inventive examples 1 to 9 is set such that an addition amount of each of the graphite and metal powder falls within the range defined herein, and applied to sleeve bricks having a thickness of 70 mm or less. It is proven that the inventive examples exhibit remarkably excellent usable limits, as compared with ones having shapes identical to those of the inventive examples among sleeve bricks of the comparative examples 1 to 21 listed in Table 2.

For example, in the comparative example 1 where the metal powder is contained in an amount of 7 mass % in addition to 100 mass % of the refractory raw material mix, which is greater than the upper limit of 6 mass %, the usable limit deteriorates by about 29% as compared with the inventive example 1 which has the same sleeve-brick shape and the same composition of the refractory raw material mix as those of the comparative example 1, and contains the metal powder in an amount of 4 mass %. Supposedly, the reason is that the excessively large metal-powder addition rate causes deterioration in thermal shock resistance, and thereby cracking occurs in the sleeve brick.

In the comparative example 6 where the metal powder is contained in an amount of 1 mass % in addition to 100 mass % of refractory raw material mix, which is less than the lower limit of 3 mass %, the usable limit deteriorates by about 23% as compared with the inventive example 4 which has the same sleeve-brick shape and the same composition of the refractory raw material mix as those of the comparative example 6, and contains the metal powder in an amount of 5 mass %. Supposedly, the reason is that the excessively low metal-powder addition rate causes insufficiency in strength, and thereby cracking occurs in the sleeve brick. The similar tendency is seen between the comparative example 8 and the inventive example 6 and between the comparative example 9 and the inventive example 7.

In the comparative example 10 where the graphite is contained in an amount of 4 mass % which is less than the lower limit of 5 mass %, the usable limit deteriorates by about 25% as compared with the inventive example 8 which has the same sleeve-brick shape as that of the comparative example 10, and contains the graphite in an amount of 6 mass %. Supposedly, the reason is that the excessively low graphite amount causes insufficiency in thermal shock resistance, and thereby cracking occurs in the sleeve brick.

In the comparative example 13 where the graphite is contained in an amount of 22 mass % which is greater than the upper limit of 20 mass %, the usable limit deteriorates by about 24% as compared with the inventive example 9 which has the same sleeve-brick shape as that of the comparative example 13, and contains the graphite in an amount of 7 mass %.

Although the composition of the comparative example 12 comprises 4 mass % of the metal powder and 10 mass % of the graphite each falling within the range defined in the appended claims, it is applied to a sleeve brick having a thickness of 85 mm. As a result, it had a usable limit inferior to the comparative example 20 which contains the metal powder in an amount of 0.7%. The reason is that durability is lowered due to cracking caused by thermal shock. The similar tendency is seen between the comparative example 4 and the comparative example 14.

TABLE 1

| | Inventive Example 1 | Inventive Example 2 | Inventive Example 3 | Inventive Example 4 | Inventive Example 5 | Inventive Example 6 | Inventive Example 7 | Inventive Example 8 | Inventive Example 9 |
|---|---|---|---|---|---|---|---|---|---|
| Sleeve code | A | B | E | F | G | H | I | J | M |
| Fused magnesia (mass %) | 90 | 82 | 84 | 84 | 92 | 92 | 94 | 94 | 93 |
| Flake graphite (mass %) | 10 | 18 | 16 | 16 | 8 | 8 | 6 | 6 | 7 |
| Pitch powder (mass %) (fixed carbon: 80%) | | 1 | | | 1 | | | | 1 |

TABLE 1-continued

|  |  | Inventive Example 1 | Inventive Example 2 | Inventive Example 3 | Inventive Example 4 | Inventive Example 5 | Inventive Example 6 | Inventive Example 7 | Inventive Example 8 | Inventive Example 9 |
|---|---|---|---|---|---|---|---|---|---|---|
| Metal powder (mass %) | Al | 4 | 4 | 5 | 3 | 4 | 4 | 4 | 4 | 2 |
|  | $Al_2Mg_3$ |  | 2 |  | 2 | 1 | 0.5 |  |  | 1.5 |
|  | Si |  |  |  |  |  |  |  | 0.5 |  |
|  | CaSiMg |  |  |  |  |  | 0.5 |  |  |  |
|  | total | 4 | 6 | 5 | 5 | 5 | 5 | 4 | 4.5 | 3.5 |
| Boride (mass %) | $B_4C$ | 0.2 |  |  |  |  |  |  | 0.2 | 0.1 |
|  | $MgB_2$ |  |  | 0.2 |  |  | 0.75 |  |  |  |
|  | $CaB_6$ |  |  |  | 1 | 1 |  |  |  |  |
|  | CrB |  | 0.1 |  |  |  |  |  |  |  |
|  | total | 0.2 | 0.1 | 0.2 | 1 | 1 | 0.75 | 0 | 0.2 | 0.1 |
| Fraction having particle diameter of greater than 10 to 500 μm in magnesia-based raw material (mass %) |  | 30 | 30 | 30 | 30 | 30 | 30 | 30 | 30 | 30 |
| Fraction having particle diameter of greater than 10 μm or less in magnesia-based raw material (mass %) |  | 1 | 1 | 1 | 1 | 1 | 1 | 1 | 1 | 1 |
| Thickness of taphole sleeve (mm) |  | 30 | 30 | 50 | 67.5 | 62.5 | 45 | 40 | 42 | 60 |
| Usable limit of sleeve (times) |  | 120 | 130 | 120 | 150 | 150 | 110 | 110 | 120 | 145 |
| [Physical Properties] |  |  |  |  |  |  |  |  |  |  |
| Bulk specific gravity |  | 3.05 | 2.92 | 2.95 | 2.95 | 3.07 | 3.06 | 3.11 | 3.10 | 3.11 |
| Apparent porosity (%) |  | 4.0 | 4.6 | 4.1 | 4.0 | 4.3 | 4.5 | 4.2 | 4.3 | 4.1 |
| Hot bending strength (MPa) |  | 28 | 27 | 26 | 27 | 30 | 32 | 29 | 33 | 27 |

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Sleeve code |  | A | B | C | D | E | F | G |
| Fused magnesia (mass %) |  | 82 | 92 | 84 | 92 | 80 | 84 | 92 |
| Flake graphite (mass %) |  | 18 | 8 | 16 | 8 | 20 | 16 | 8 |
| Pitch powder (mass %) (fixed carbon: 80%) |  | 1 | 1 | 1 | 1 |  |  | 1 |
| Metal powder (mass %) | Al | 5 | 1 | 1 | 5 | 1 | 1 | 1 |
|  | $Al_2Mg_3$ | 2 |  |  |  |  |  |  |
|  | Si |  |  |  | 1 | 1 |  | 1 |
|  | CaSiMg |  |  |  |  |  |  |  |
|  | total | 7 | 1 | 1 | 6 | 2 | 1 | 2 |
| Boride (mass %) | $B_4C$ |  | 0.2 |  |  |  |  |  |
|  | $MgB_2$ |  |  |  |  |  |  |  |
|  | $CaB_6$ |  |  |  | 0.1 | 1 | 1 | 1 |
|  | CrB |  |  |  |  |  |  |  |
|  | total | 0 | 0.2 | 0 | 0.1 | 1 | 1 | 1 |
| Fraction having particle diameter of greater than 10 to 500 μm in magnesia-based raw material (mass %) |  | 30 | 30 | 30 | 30 | 30 | 30 | 30 |
| Fraction having particle diameter of greater than 10 μm or less in magnesia-based raw material (mass %) |  | 1 | 1 | 1 | 1 | 1 | 1 | 1 |
| Thickness of taphole sleeve (mm) |  | 30 | 30 | 97.5 | 97.5 | 50 | 67.5 | 62.5 |
| Usable limit of sleeve (times) |  | 95 | 80 | 160 | 110 | 95 | 115 | 120 |
| [Physical Properties] |  |  |  |  |  |  |  |  |
| Bulk specific gravity |  | 2.92 | 3.09 | 2.96 | 3.00 | 2.94 | 2.97 | 3.05 |
| Apparent porosity (%) |  | 4.2 | 4.1 | 3.9 | 4.4 | 4.2 | 4.3 | 4.4 |
| Hot bending strength (MPa) |  | 26 | 24 | 19 | 29 | 23 | 24 | 23 |

|  |  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|
| Sleeve code |  | H | I | J | K | L | M | N |
| Fused magnesia (mass %) |  | 92 | 94 | 96 | 96 | 90 | 78 | 90 |
| Flake graphite (mass %) |  | 8 | 6 | 4 | 4 | 10 | 22 | 10 |
| Pitch powder (mass %) (fixed carbon: 80%) |  |  |  |  | 1 | 1 | 1 |  |
| Metal powder (mass %) | Al | 0.5 | 0.5 | 4 | 0.2 | 4 | 2 | 2 |
|  | $Al_2Mg_3$ |  |  |  | 1 |  |  | 1.5 |
|  | Si |  |  |  |  |  | 1 |  |
|  | CaSiMg |  |  |  |  |  |  |  |
|  | total | 0.5 | 0.5 | 5 | 0.2 | 4 | 3 | 3.5 |

TABLE 2-continued

|  |  |  |  |  |  |  |  |  |
|---|---|---|---|---|---|---|---|---|
| Boride (mass %) | B$_4$C |  |  | 0.2 |  |  | 0.5 | 0.1 |
|  | MgB$_2$ |  |  |  |  |  |  |  |
|  | CaB$_6$ |  |  |  |  |  |  |  |
|  | CrB |  |  |  |  |  |  |  |
|  | total | 0 | 0 | 0.2 | 0 | 0 | 0.1 | 0 |
| Fraction having particle diameter of greater than 10 to 500 μm in magnesia-based raw material (mass %) |  | 30 | 30 | 30 | 30 | 30 | 30 | 30 |
| Fraction having particle diameter of greater than 10 μm or less in magnesia-based raw material (mass %) |  | 1 | 1 | 1 | 1 | 1 | 1 | 1 |
| Thickness of taphole sleeve (mm) |  | 45 | 40 | 42 | 105 | 85 | 60 | 120 |
| Usable limit of sleeve (times) |  | 85 | 90 | 90 | 205 | 105 | 110 | 100 |
| [Physical Properties] |  |  |  |  |  |  |  |  |
| Bulk specific gravity |  | 3.07 | 3.11 | 3.13 | 3.14 | 3.08 | 2.88 | 3.04 |
| Apparent porosity (%) |  | 3.9 | 4.0 | 4.6 | 4.0 | 3.9 | 3.8 | 4.1 |
| Hot bending strength (MPa) |  | 22 | 24 | 35 | 24 | 29 | 19 | 30 |

|  |  | Comparative Example 15 | Comparative Example 16 | Comparative Example 17 | Comparative Example 18 | Comparative Example 19 | Comparative Example 20 | Comparative Example 21 |
|---|---|---|---|---|---|---|---|---|
| Sleeve code |  | A | A | C | D | K | L | N |
| Fused magnesia (mass %) |  | 82 | 82 | 91 | 85 | 96 | 95 | 90 |
| Flake graphite (mass %) |  | 18 | 18 | 9 | 8 | 4 | 5 | 10 |
| Pitch powder (mass %) (fixed carbon: 80%) |  | 1 | 1 | 1 | 1 | 1 | 1 |  |
| Metal powder (mass %) | Al | 6 | 7 | 4 | 4 | 0.35 | 0.7 | 1.5 |
|  | Al$_2$Mg$_3$ | 2 | 2 |  |  |  |  | 1 |
|  | Si |  |  | 0.3 | 0.3 |  |  |  |
|  | CaSiMg |  |  |  |  |  |  |  |
|  | total | 8 | 9 | 4.3 | 4.3 | 0.35 | 0.7 | 2.5 |
| Boride (mass %) | B$_4$C |  |  |  |  |  |  |  |
|  | MgB$_2$ |  |  |  |  |  |  |  |
|  | CaB$_6$ |  |  |  |  |  |  |  |
|  | CrB |  |  |  |  |  |  |  |
|  | total | 0 | 0 | 0 | 0 | 0 | 0 | 0 |
| Fraction having particle diameter of greater than 10 to 500 μm in magnesia-based raw material (mass %) |  |  |  | 30 | 30 | 30 | 30 | 30 |
| Fraction having particle diameter of greater than 10 μm or less in magnesia-based raw material (mass %) |  |  |  | 1 | 1 | 1 | 1 | 1 |
| Thickness of taphole sleeve (mm) |  | 30 | 30 | 97.5 | 97.5 | 105 | 85 | 120 |
| Usable limit of sleeve (times) |  |  |  | 185 | 175 | 210 | 185 | 210 |
| [Physical Properties] |  |  |  |  |  |  |  |  |
| Bulk specific gravity |  | 2.90 | 2.89 | 3.05 | 3.00 | 3.14 | 3.12 | 3.06 |
| Apparent porosity (%) |  | 4.3 | 4.5 | 4.2 | 4.2 | 4.0 | 3.9 | 3.9 |
| Hot bending strength (MPa) |  | 28 | 30 | 27 | 26 | 25 | 26 | 25 |

TABLE 3

|  | Sleeve code | | | | | | | | | | | | | |
|---|---|---|---|---|---|---|---|---|---|---|---|---|---|---|
|  | A | B | C | D | E | F | G | H | I | J | K | L | M | N |
| Inner diameter of taphole sleeve (mm) | 130 | 130 | 140 | 140 | 170 | 140 | 130 | 150 | 170 | 155 | 210 | 170 | 180 | 220 |
| Thickness of taphole sleeve (mm) | 30 | 30 | 97.5 | 97.5 | 50 | 67.5 | 62.5 | 45 | 40 | 42 | 105 | 85 | 60 | 120 |
| Length of taphole sleeve (mm) | 1400 | 1300 | 1600 | 1800 | 2200 | 700 | 1260 | 1815 | 1750 | 1200 | 1400 | 1700 | 900 | 1900 |

The invention claimed is:

1. A sleeve brick having a thickness of 70 mm or less and obtained by carrying out steps comprising:
preparing a forming mixture by adding a powder of one or more metals selected from the group consisting of aluminum (Al), silicon (Si), magnesium (Mg), calcium (Ca), chromium (Cr), and alloys thereof in an amount greater than 3 to 6 mass % and an organic binder to 100 mass % of a refractory raw material mixture containing 60 to 95 mass % of a magnesia raw material and 5 to 20 mass % of graphite; and
subjecting the prepared forming mixture to kneading, forming, and heat treatment, wherein the magnesia raw material in the refractory raw material mixture includes a first particle fraction having a particle diameter of greater than 10 to 500 μm occupying 20 to 50 mass % and a second particle fraction having a particle diameter of 10 μm or less occupying 5 mass % or less.

2. The sleeve brick according to claim 1, wherein preparing the forming mixture further includes adding 0.1 to 3 mass % of a powder of one or more selected from the group of boron (B), boron carbide (B$_4$C), magnesium diboride (MgB$_2$), calcium hexaboride ($CaB_6$), and chromium boride (CrB) to 100 mass % of the refractory raw material mixture.

3. The sleeve brick according to claim 1, wherein the thickness of 70 mm or less is set prior to preparing the forming mixture.

4. The sleeve brick according to claim 1, wherein the sleeve brick has a length in a range of 700 to 3000 mm.

5. The sleeve brick according to claim 1, wherein the sleeve brick has a cylindrical shape.

6. The sleeve brick according to claim 1, wherein the sleeve brick includes a tapered portion.

7. A sleeve brick obtained by carrying out steps comprising:

setting a thickness for the sleeve brick at 70 mm or less;

preparing a forming mixture by adding a powder of one or more metals selected from the group consisting of aluminum (Al), silicon (Si), magnesium (Mg), calcium (Ca), chromium (Cr), and alloys thereof in an amount greater than 3 to 6 mass % and an organic binder to 100 mass % of a refractory raw material mixture containing 60 to 95 mass % of a magnesia raw material and 5 to 20 mass % of graphite; and subjecting the prepared forming mixture to kneading, forming, and heat treatment, wherein the magnesia raw material in the refractory raw material mixture includes a first particle fraction having a particle diameter of greater than 10 to 500 μm occupying 20 to 50 mass % and a second particle fraction having a particle diameter of 10 μm or less occupying 5 mass % or less.

8. The sleeve brick according to claim 7, wherein preparing the forming mixture further includes adding 0.1 to 3 mass % of a powder of one or more selected from the group of boron (B), boron carbide ($B_4C$), magnesium diboride ($MgB_2$), calcium hexaboride ($CaB_6$), and chromium boride (CrB) to 100 mass % of the refractory raw material mixture.

9. The sleeve brick according to claim 7, wherein the sleeve brick has a length in a range of 700 to 3000 mm.

10. The sleeve brick according to claim 7, wherein the sleeve brick has a cylindrical shape.

11. The sleeve brick according to claim 7, wherein the sleeve brick has a tapered portion.

\* \* \* \* \*